United States Patent [19]
Fletcher et al.

[11] Patent Number: 5,919,495
[45] Date of Patent: Jul. 6, 1999

[54] DOUGH TRANSFER HOPPER

[75] Inventors: Jack Fletcher; Michael Hayden, both of Sidney, Ohio

[73] Assignee: Shaffer Manufacturing Corp., Sidney, Ohio

[21] Appl. No.: 08/931,998

[22] Filed: Sep. 17, 1997

[51] Int. Cl.⁶ .................. A21C 5/00; A21C 3/10
[52] U.S. Cl. .............. 425/238; 425/241; 425/294; 426/503
[58] Field of Search .................. 425/238, 239, 425/241, 294, 302.1, 371; 426/503

[56] References Cited

U.S. PATENT DOCUMENTS

| | | | |
|---|---|---|---|
| 1,431,718 | 10/1922 | Blum | 425/241 |
| 4,676,727 | 6/1987 | Atwood | 425/238 |
| 5,310,569 | 5/1994 | Muller | 426/502 |
| 5,427,515 | 6/1995 | Muller et al. | 425/96 |
| 5,486,048 | 1/1996 | Konig | 425/238 |
| 5,496,578 | 3/1996 | Muller et al. | 426/502 |
| 5,573,788 | 11/1996 | Atwood | 425/238 |
| 5,733,583 | 3/1998 | Muller | 425/238 |
| 5,811,145 | 9/1998 | Morikawa | 425/241 |

OTHER PUBLICATIONS

Lanham Bakery Solutions, Inc., "Rotary Dough Feeder", undated.
F.M.E. Food Machinery Engineering Ltd., "Hopper and Dough Transport Unit", undated.
Alliance Baking Systems, Inc., "Dough Dividing Unit", undated.
ETM, "Dough Chunker With Dough Conveyer", undated.

*Primary Examiner*—James P. Mackey
*Attorney, Agent, or Firm*—Harness, Dickey & Pierce, P.L.C.

[57] ABSTRACT

A dough transfer hopper and method for partitioning dough pieces having a precise volume from a dough mass is disclosed. The dough transfer hopper includes a hopper assembly having a pair of inwardly angled end walls and a pair of arcuate side walls defining an upper and lower opening. A cutting assembly is operatively disposed within the lower opening and includes a pair of cutters which operate in a counter-rotating manner to partition a dough piece having a precise volume from a dough mass and deposit the dough piece on a horizontal conveyor assembly. The horizontal conveyor transports the dough piece to an inclined conveyor assembly. The inclined conveyor assembly includes a pair of counter-rotating conveyor belts for transporting the dough piece from the horizontal conveyor to a transfer conveyor assembly for further processing.

33 Claims, 4 Drawing Sheets

DOUGH TRANSFER HOPPER

BACKGROUND AND SUMMARY OF THE INVENTION

This invention relates generally to machinery utilized in the preparation of dough for bread, pizza crust, and the like, and more particularly to a dough transfer hopper which receives a dough mass from a mixing apparatus and which partitions and conveys smaller, more usable dough pieces for subsequent processing.

Currently, a large batch of dough, in the range of two hundred (200) to three thousand (3,000) pounds, is created by measuring the required dry ingredients, such as flour, sugar, yeast, salt, etc., and mixing these ingredients with an appropriate amount of liquid ingredients, such as water, oil, etc. in a commercial mixer. The commercial mixer mixes and kneads the ingredients for a prescribed duration, resulting in a dough mass having the desirable characteristics.

This dough mass is then partitioned and transferred for subsequent processing. There are presently two types of machinery for performing this dough partitioning process. A first type of machinery employs a dough pump which pushes and transports dough by way of an auger or helical screw. These systems have the disadvantage of continuing to knead or further work the dough as it is transported. As such, the gluten network which had previously been developed during the kneading process is further worked and potentially damaged or destroyed. A second type of machinery has been developed for dividing and transporting dough pieces which employs a pair of oppositely rotating cutters which are positioned below a storage bin. In operation, the dough mass is disposed within the storage bin. Gravity pulls the dough mass out of an opening formed in the storage bin and onto the cutters which are rotationally driven in opposite directions. The dough mass is drawn into the cutters and divided into dough pieces which are subsequently deposited onto a conveyor belt for further processing.

While the latter described devices have been generally successful in eliminating the excess kneading of the dough mass, other difficulties have been encountered. As an example, the dough mass will tend to form a bridge across the opening at the bottom of the hopper such that the dough mass cannot be drawn into and cut by the cutters. Furthermore, the configuration and design of the storage bin has required vertical positioning of the mixer assembly in order to transfer the dough mass from the mixing apparatus to the storage bin. In addition, the cutting blades on existing dividers do not provide an adequate edge for cutting and separating uniform dough pieces from the dough mass. Furthermore, these existing systems have utilized conveyors which are permanently affixed thereto, making the equipment difficult to transport and position within the manufacturing facility.

Accordingly, it is a primary object of the present invention to overcome the disadvantages of the prior art and provide an efficient dough transfer hopper that simply and consistently divides a precise volume of dough from the dough mass and which minimizes the potential for bridging of the dough mass within the storage bin.

Another object of the present invention is to provide a dough transfer hopper with an improved set of cutting blades for separating individual dough pieces from the dough mass.

A further object of the present invention is to provide a dough transfer hopper which eliminates the need to vertically position the associated mixing apparatus during transfer of the dough mass from the mixing apparatus to the dough transfer hopper.

Yet another object of the present invention is to provide a stand-alone conveyor system for transporting the dough pieces for subsequent processing which can be readily removed from a dough transfer hopper.

Additional objects and advantages will become apparent from a reading of the following detailed description of the preferred embodiment taken in conjunction with the accompanying drawings and appended claims.

DETAILED DESCRIPTION OF THE PREFERRED EMBODIMENT

Figure 1:
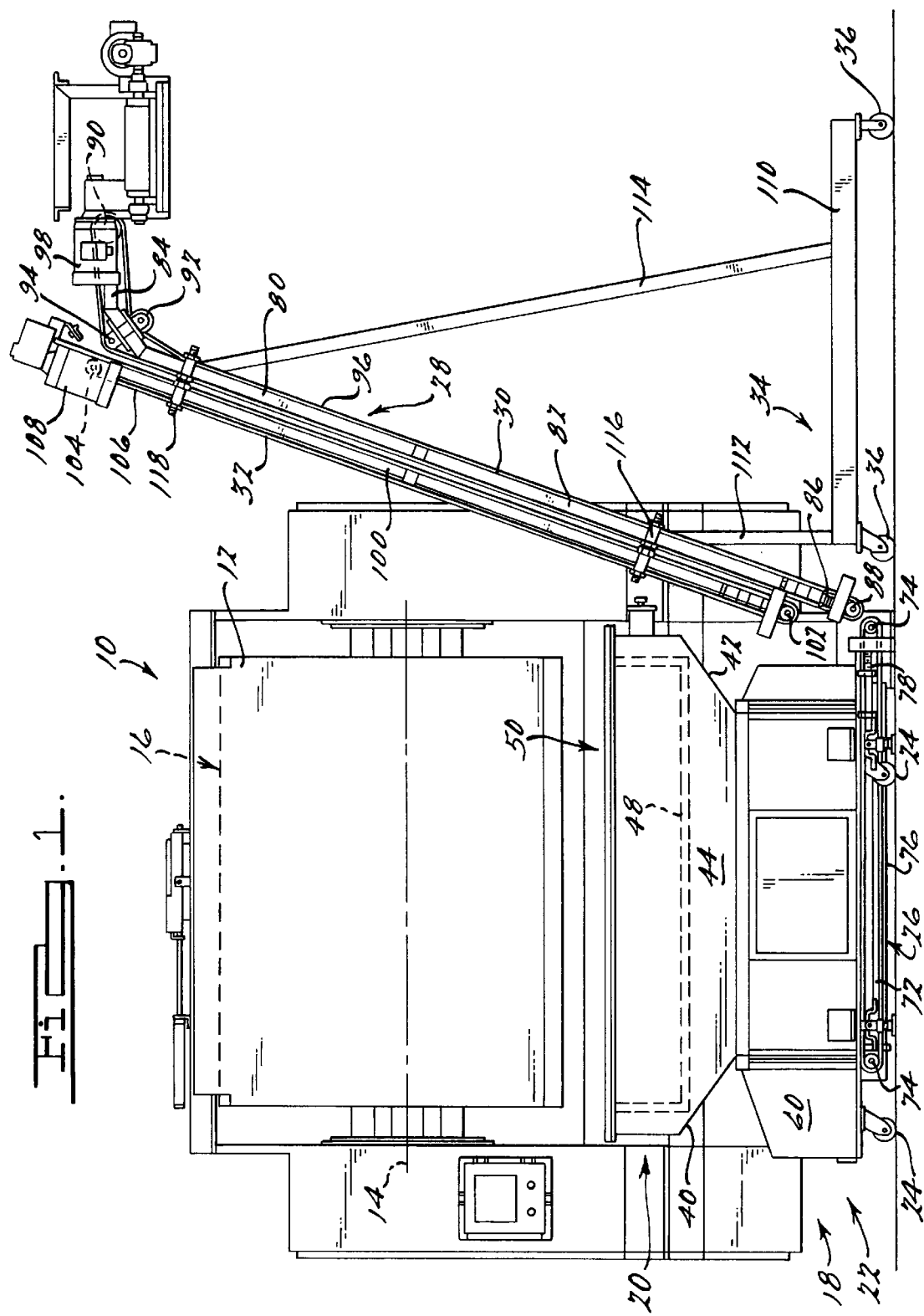
FIG. 1 is a side elevational view of the dough transfer hopper of the present invention shown operatively associated with a mixing apparatus and a conveyor assembly.
Figure 2:
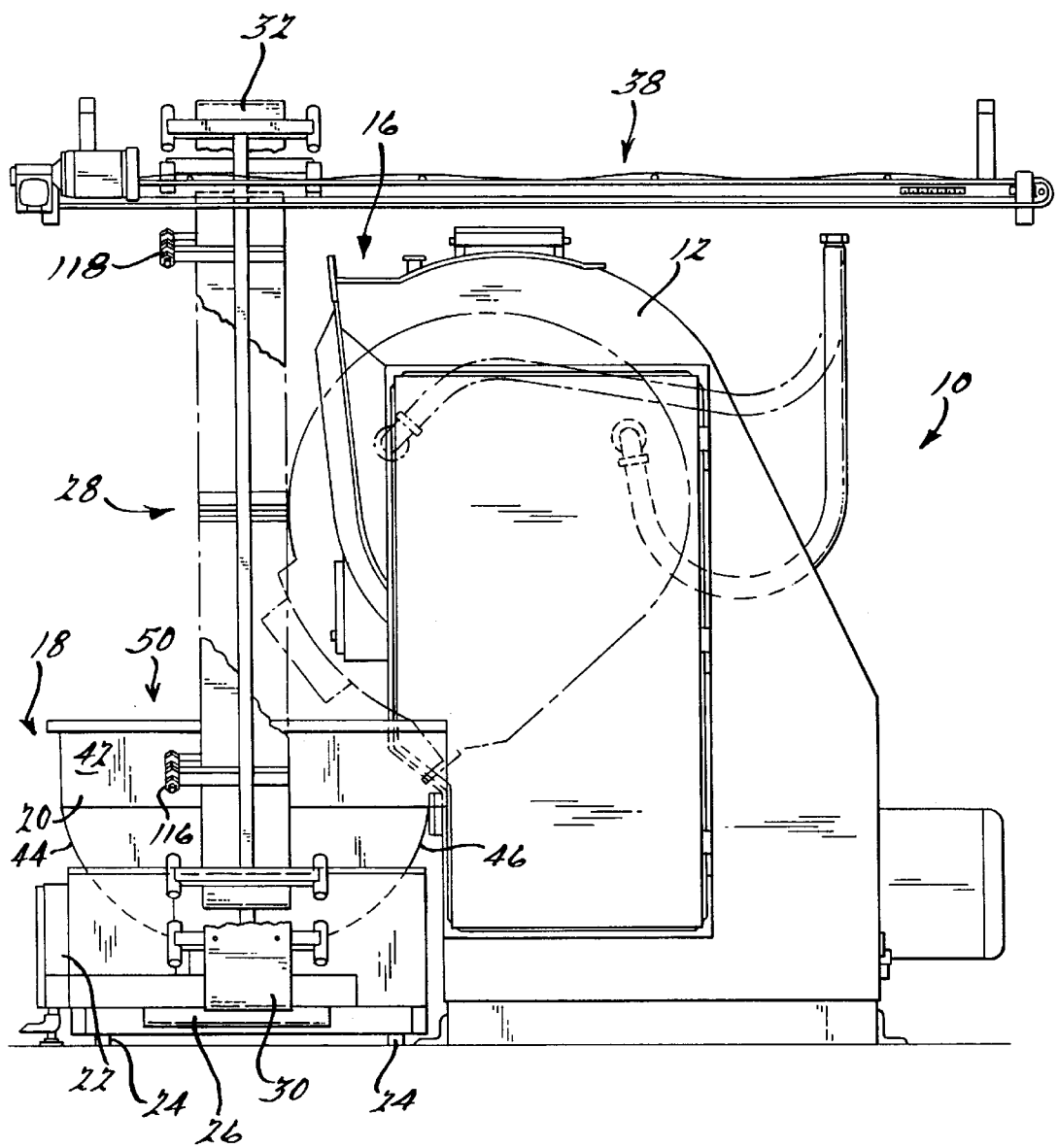
FIG. 2 is an end view of the present invention as shown in FIG. 1.

The present invention is directed to a dough transfer hopper to be utilized in conjunction with a mixing apparatus to dispense and transport dough pieces such as bread dough, pizza dough, or the like for further processing. Referring to FIGS. 1 and 2, mixing apparatus 10 is a tilting mixer having a rotatable mixing bowl 12 operatively associated therewith for receiving a quantity of ingredients necessary for making a dough mass (not shown). Mixing bowl 12 is tiltably positioned about a transverse axis 14 of mixer apparatus 10 such that the dough mass contained within the interior thereof can be dumped out of opening 16 formed therein. A presently preferred mixing apparatus, Model Nos. 3HS-30HS, is available from Shaffer Manufacturing Corp., Sidney, Ohio. While the present invention has been described in connection with a tilt bowl mixer, one skilled in the art will appreciate that other mixing apparatii such as a stationary bowl mixer could be utilized herewith.

Dough transfer hopper 18 is positioned adjacent to mixing apparatus 10 such that the dough mass can be readily transferred out of mixing apparatus 10 into dough transfer hopper 18. Dough transfer hopper 18 includes hopper assembly 20 which is supported by base assembly 22. A set of casters 24 extend from base assembly 22 to facilitate positioning of dough transfer hopper 18. A horizontal conveyor assembly 26 is supported by base assembly 22 and operatively disposed beneath hopper assembly 20.

Inclined conveyor assembly 28 is operative positioned at the discharge end of horizontal conveyor assembly 26 and includes a lower conveyor assembly 30 and an upper conveyor assembly 32 positioned substantially parallel to one another. Support frame 34 supports upper and lower conveyor assemblies 30, 32 at an inclined angle relative to horizontal conveyor assembly 26. A set of casters 36 extend from support frame 34 for facilitating manipulation of inclined conveyor assembly 28. Horizontal conveyor assembly 38 is operatively disposed at the discharge end of inclined conveyor assembly 28. While the present invention has been described in connection with an inclined conveyor assembly, one skilled in the art will appreciate that the present invention is readily adaptable for use with various transfer and processing equipment.

In operation, a large dough mass is prepared in mixing apparatus 10 and deposited into hopper assembly 20 where it is partitioned into smaller dough pieces which are dropped onto horizontal conveyor assembly 26. Horizontal conveyor assembly 26 transports the dough pieces to the intake end of inclined conveyor assembly 28 which transports the dough pieces upwardly between lower conveyor assembly 30 and upper conveyor assembly 32. Inclined conveyor assembly 28 discharges the dough pieces onto horizontal conveyor assembly 38 which transports the dough pieces onto subsequent processing stations.

Figure 3:
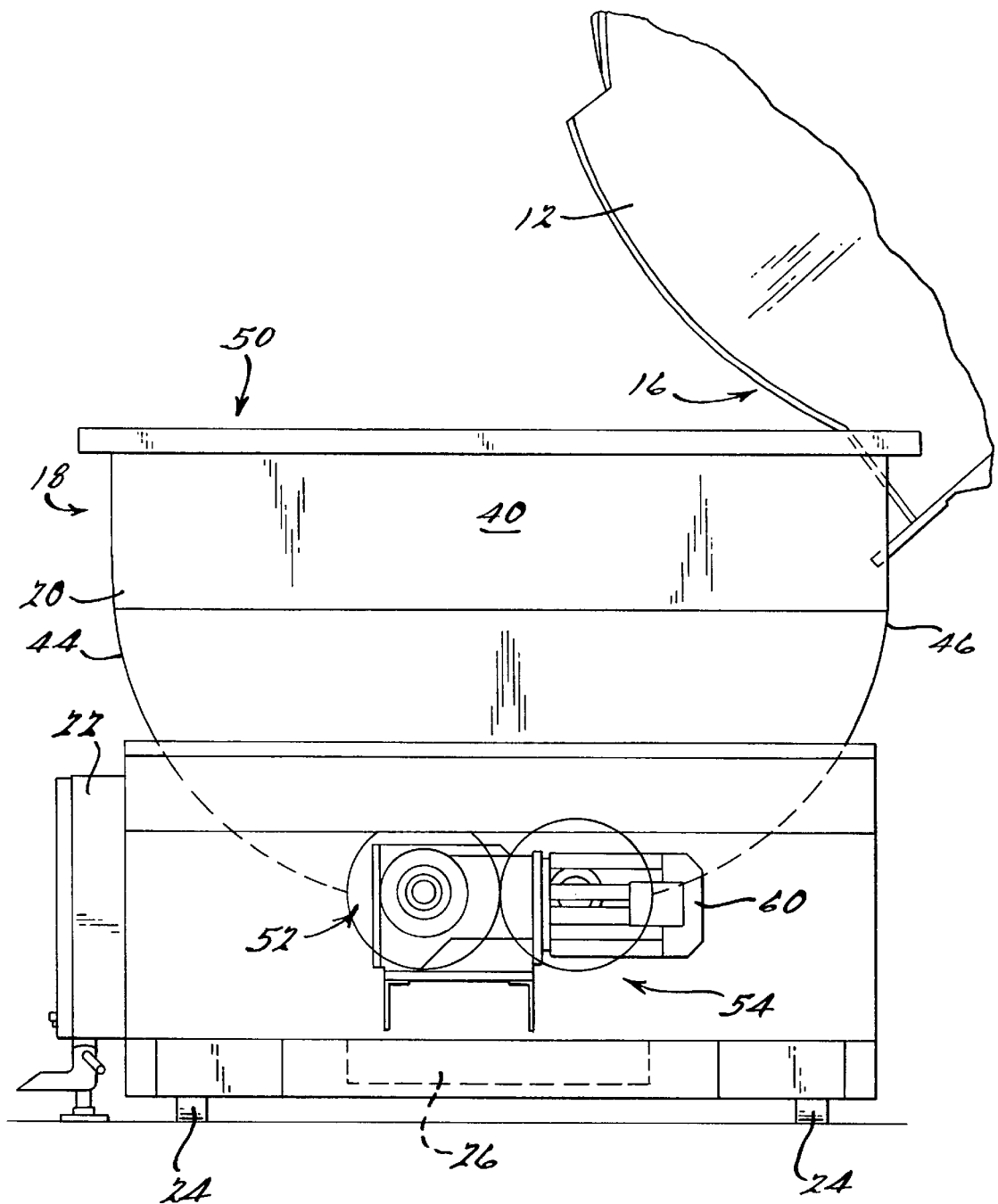
FIG. 3 is an enlarged end view of the dough transfer hopper of the present invention.

Referring now to FIGS. 1 and 3, hopper assembly 20 includes a pair of end walls 40, 42 laterally spaced apart by a pair of side walls 44, 46. Side wall 46 of hopper assembly 20 has a recessed lip portion 48 formed therein for providing clearance for bowl 12 to be tilted into position during the dough mass transfer operation, as such, bowl 12 does not need to be vertically positioned during the dough mass transfer operation. End walls 40, 42 and side walls 44, 46 define an upper opening 50 and a lower opening 52. As best seen in FIG. 1, end walls 40, 42 include a substantially vertical upper portion and an inwardly angled lower portion. Similarly, as best seen in FIG. 3, side walls 44, 46 include a substantially vertical upper side wall portion and an arcuate lower portion. End walls 40, 42 and side walls 44, 46 define a tapered chute extending from upper opening 50 to lower opening 52. Furthermore, the arcuate lower side wall portion of side walls 44, 46 smoothly transitions from vertical upper side wall portion to lower opening 52, thereby preventing the dough mass from bridging across lower opening 52. While in the embodiment presently preferred arcuate lower side wall portion is formed as a constant radiused side wall, one skilled in the art will appreciate that the arcuate lower side wall may be any curvilinear surface which provides a smooth transition from upper opening 50 to lower opening 52.

Figures 4, 5:
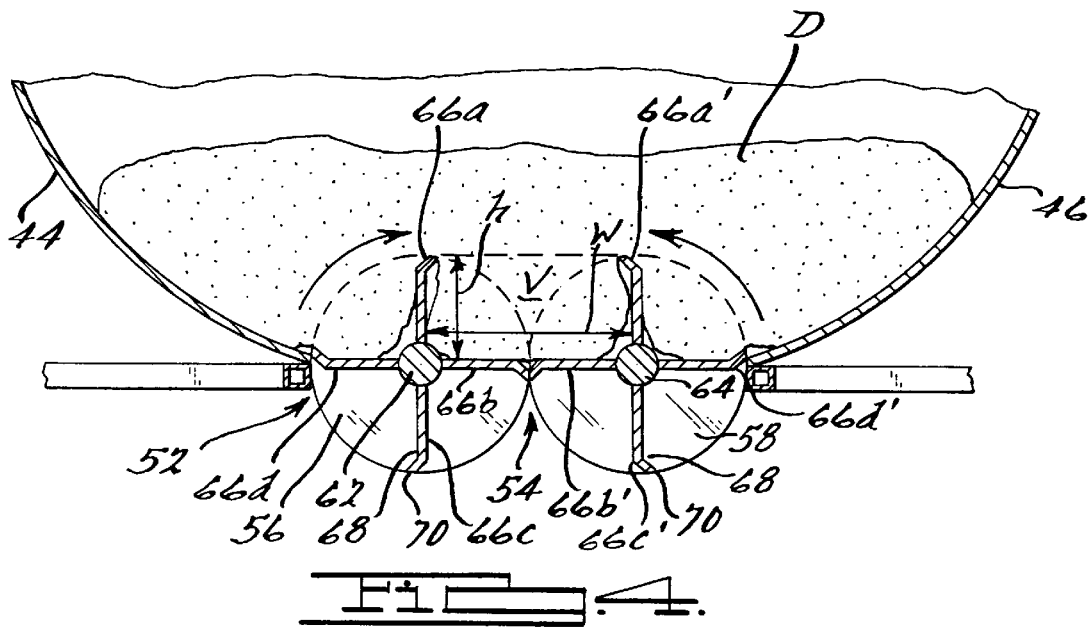
FIG. 4 is a partial cross-sectional view of the present invention illustrating the partitioning of a dough piece from a dough mass in the hopper.
FIG. 5 is a view similar to FIG. 4 with the cutting blades rotatably positioned to ejecting the dough piece from the dough transfer hopper.

Referring now to FIGS. 3 and 4, a cutting assembly 54 is disposed within lower opening 52 of hopper assembly 18. Cutting assembly 54 includes a pair of cutters 56, 58 which are operatively coupled to and driven in a counter-rotating manner, as indicated by the arrows in FIG. 4, by motor assembly 60 supported from base assembly 22. More specifically, referring to FIG. 4, cutter 56 rotates in a clockwise manner and cutter 58 rotates in a counter-clockwise manner as indicated by the arrows. As presently preferred, motor assembly 60 includes a gear assembly which permits both cutter 56 and cutter 58 to be driven by a common motor, thereby maintaining synchronous rotation of cutters 56, 58.

Cutters 56, 58 include an axle shaft 62, 64 each having a longitudinal axis. A set of four blades 66a, 66b, 66c, 66d are equally distributed about and welded to or otherwise secured by a suitable means to axle shaft 62 and extend radially therefrom. Similarly, a complementary set of set of four blades 66a', 66b', 66c', 66d' are equally distributed about and welded to or otherwise suitably secured by similar means to axle shaft 64 and extend radially therefrom. A partitioning volume V is defined by the height h of blade 66a, the distance w between blade 66b and blade 66b' and the longitudinal length of blade 66. One skilled in the art will readily recognize that partition volume V defines the size of dough pieces d to be separated from dough mass D by cutting assembly 54. The radially outer edge 68 of each blade 66 is bent forwardly in said direction of rotation along an axis parallel to said longitudinal axis. More specifically, the outer edge 68 of each blade 66 is bent at a forty-five degree (45°) angle in the direction of rotation to strengthen the cutting edges 70 of each cutter blade 66. Cutting edges 70 are also machined to a knife edge to facilitate the cutting process performed by cutting assembly 54.

Cutting assembly 54 is positioned within hopper assembly 20 such that the longitudinal axis defined by axle shafts 62, 64 lie approximately within a plane defined by lower opening 52 at the bottom of end walls 40, 42 and side walls 44, 46. Thus, the upper half of cutting assembly 54 is disposed within hopper assembly 20 while the lower half of cutting assembly 54 extends below hopper assembly 20 and above horizontal conveyor assembly 26. In this way, partitioning volume V is wholly contained within said hopper assembly when cutting blade 66b and cutting blade 66b' are radially aligned as shown in FIG. 4. The configuration of each set of cutting blades are such that the cutting blades 66d, 66d' serve to cover lower opening 52 when cutting blades 66b, 66b' are radially aligned. Thus, dough mass D situated in hopper assembly 20 cannot bridge across or fall through lower opening 52 and cutting assembly 54 is able to process dough mass D in its entirety. Referring now to FIG. 1, horizontal conveyor assembly 26 is a standard transfer conveyor typically used in the food-handling industry. More specifically, horizontal conveyor assembly 26 includes conveyor frame 72 having rollers assemblies 74 extending from each end thereof. Roller assemblies 74 support conveyor belt 76 having an exposed, non-stick surface. Tensioning mechanism 78 is operatively disposed between roller assembly 74 and conveyor frame 72 to provide appropriate tension in conveyor belt 76. Conveyor belt 76 is driven in a clockwise direction as shown in FIG. 1 by a suitable conveyor belt drive assembly.

Inclined conveyor assembly 28 includes lower conveyor frame 80 having an inclined lower portion 82 which transitions to a horizontally extending discharge portion 84. Tensioning assembly 86 positions and supports lower conveyor roller assembly 88 from lower portion 82 of conveyor frame 80. Similarly, upper conveyor roller assembly 90 is rotatably supported from discharge portion 84 of conveyor frame 80. A pair of intermediate conveyor roller assemblies 92, 94 are positioned on conveyor frame 80 at the transition point between lower portion 82 and discharge portion 84. Conveyor roller assemblies 88, 90, 92, 94 support and lower conveyor belt 96 having an exposed, non-stick surface formed thereon which defines the lower transport surface for inclined conveyor assembly 28. Lower conveyor belt 96 is driven in a clockwise manner as shown in FIG. 1 by a suitable motor assembly 98.

Upper conveyor assembly 32 includes a substantially straight inclined frame portion 100 having a lower conveyor roller assembly 102 operably supported at a lower end thereof. Similarly, an upper conveyor roller assembly 104 is operatively disposed at the upper end of conveyor frame 100. Roller assemblies 102, 104 support conveyor belt 106 having an exposed non-stick surface formed thereon which defines the upper transport surface for inclined conveyor assembly 28. Upper conveyor belt 106 is driven in a counter-clockwise manner as shown in FIG. 1 by a suitable drive assembly 108. Thus, lower conveyor belt 96 and upper conveyor belt 106 are driven in a relative counter-rotation manner.

Support frame 34 includes a rectangular base 110 from which casters 36 extend downwardly. Support member 112 and support member 114 extend vertically upwardly from base 110 to appropriately position and support lower conveyor assembly 30 and upper conveyor assembly 32. Spacer supports 116, 118 hold upper conveyor assembly 32 above lower conveyor assembly 30 in a substantially parallel and spaced-apart relationship.

Referring now to all of the figures, the operation of the present invention will now be described. The ingredients necessary to prepare a desired dough are dispensed into mixing assembly 10 and combined to form a dough mass D. After dough mass D has obtained the desired characteristics through mixing and kneading, dough mass D is transferred from mixer bowl 12 to hopper assembly 20 of dough transfer hopper 18. The contour of hopper assembly 20 directs dough mass D towards lower opening 52 and cutting assembly 54. Since the upper half of cutting assembly 54 is disposed within hopper assembly 20, dough mass D substantially engages cutting assembly 54.

As best seen in FIGS. 4 and 5, cutters 56, 58 are driven in a counter-rotating fashion, thereby drawing a portion of the dough mass into partitioning volume V. As cutters 56, 58 rotate, dough piece d is sectioned by adjacent blades 66a, 66b, 66a', 66b' and cut from the remaining dough mass D by cutting edge 70. The angled orientation on cutting edge 68 of blades 66 facilitate separation of dough piece d from the remaining dough mass D. As cutters 56, 58 further rotate dough piece d is severed from dough mass D, transferred through lower opening 52 and deposited onto horizontal conveyor assembly 26.

Horizontal conveyor assembly 26 is driven in a clockwise manner to transport the dough piece away from the lower opening toward inclined conveyor assembly 28. Upon reaching inclined conveyor assembly 28, lower conveyor assembly 30 and upper conveyor assembly 32 are driven in counter-rotating fashion, thereby transferring the dough piece from horizontal conveyor assembly 26 onto inclined conveyor assembly 28. More specifically, lower conveyor assembly 30 and upper conveyor assembly 32 work in combination to hold the dough piece therebetween for transportation along inclined conveyor assembly 28 without further kneading. Upon reaching discharge portion 84 of inclined conveyor assembly 28, the dough piece disengages from upper conveyor assembly 32 and remains on the surface of lower conveyor assembly 30 until it is transferred to horizontal conveyor assembly 38. The dough piece is then transported along horizontal conveyor assembly 38 to subsequent processing stations, such as rollers, cutters, loafers, ovens, sheeters and other such makeup or processing equipment.

While it is apparent that the preferred embodiments of the present invention disclosed are well calculated to provide the advantages and features above-stated, it will be appreciated that the invention is susceptible to modifications, variations and change without departing from the proper scope or fair meaning of the subjoined claims.

We claim:

1. A dough transfer hopper comprising:
    a hopper assembly including a pair of end walls laterally spaced apart by a pair of side walls, each of said pair of side walls having an arcuate side wall portion terminating at a lower opening;
    a base assembly supporting said hopper assembly; and
    a cutting assembly including a first cutter operatively coupled to a drive assembly for rotation about a first longitudinal axis in a first direction, and a second cutter operatively coupled to said drive assembly for rotation about a second longitudinal axis in a second direction opposite of said first direction, said cutting assembly being supported from said base assembly such that said first longitudinal axis and said second longitudinal axis lie substantially within a plane defined by said lower opening.

2. The dough transfer hopper of claim 1 wherein said each of said first cutter and said second cutter comprises an axle shaft defining said longitudinal axis and a set of cutting blades extending radially outwardly from said axle shaft.

3. The dough transfer hopper of claim 2 wherein each of said cutting blades includes a first end secured to said axle shaft and a second end having a cutting edge formed thereon.

4. The dough transfer hopper of claim 3 wherein said cutting edge has a knife edge formed thereon.

5. The dough transfer hopper of claim 3 wherein each of said cutting blades is bent forwardly in said direction of rotation along an axis parallel to said longitudinal axis.

6. The dough transfer hopper of claim 1 wherein one of said pair of side walls has a recessed lip portion formed in an upper portion thereof.

7. The dough transfer hopper of claim 1 further comprising a first conveyor assembly including a conveyor belt operatively disposed beneath said cutting assembly.

8. The dough transfer hopper of claim 7 wherein said first conveyor assembly is positioned in a substantially horizontal orientation beneath said cutting assembly.

9. The dough transfer hopper of claim 7 further comprising a second conveyor assembly operatively positioned at a discharge end of said first conveyor assembly, said second conveyor assembly having a first conveyor belt and a second conveyor belt spaced apart from said first conveyor belt in a substantially parallel manner, said first and second conveyor belts rotating in a counter-rotating manner.

10. The dough transfer hopper of claim 9 wherein said second conveyor assembly further comprises a support frame supporting said first and second conveyors belts at an inclined orientation relative to said first conveyor assembly.

11. The dough transfer hopper of claim 1 wherein said pair of end walls and said pair of side walls define a tapered chute terminating at said lower opening.

12. The dough transfer hopper of claim 11 wherein each of said pair of end walls having an inwardly angled lower portion.

13. A dough transfer hopper comprising:
    a hopper assembly including a pair of end walls laterally spaced apart by a pair of side walls, each of said pair of side walls having an arcuate side wall portion terminating at a lower opening;
    a base assembly supporting said hopper assembly; and
    a cutting assembly including a first cutter having a first axle shaft and a first set of cutting blades extending radially from said first axle shaft and a second cutter having a second axle shaft and a second set of cutting blades extending radially from said second axle shaft, said first and second cutters being operatively coupled to a drive assembly for rotation in a counter-rotating manner such that a partitioning volume defined by said first and second set of cutting blades is positioned above said lower opening when the cutting assembly is positioned in a first position whereby a first cutting blade of said first cutter and a first cutting blade of said second cutter are radially aligned and such that said partitioning volume is positioned entirely below said lower opening when said cutting assembly is in a second position whereby a second cutting blade of said first cutter and a second cutting blade of said second cutter are radially aligned.

14. The dough transfer hopper of claim 13 wherein each of said cutting blades includes a first end secured to said axle shaft and a second end having a cutting edge formed thereon.

15. The dough transfer hopper of claim 14 wherein said cutting edge has a knife edge formed thereon.

16. The dough transfer hopper of claim 14 wherein each of said cutting blades is bent forwardly in said direction of rotation along an axis parallel to a longitudinal axis defined by each of said first and second axle shafts.

17. The dough transfer hopper of claim 13 wherein one of said pair of side walls has a recessed lip portion formed in an upper portion thereof.

18. The dough transfer hopper of claim 13 further comprising a first conveyor assembly including a conveyor belt operatively disposed beneath said cutting assembly.

19. The dough transfer hopper of claim 18 wherein said first conveyor assembly is positioned in a substantially horizontal orientation beneath said cutting assembly.

20. The dough transfer hopper of claim 18 further comprising a second conveyor assembly operatively positioned at a discharge end of said first conveyor assembly, said second conveyor assembly having a first conveyor belt and a second conveyor belt spaced apart from said first conveyor belt in a substantially parallel manner, said first and second conveyor belts rotating in a counter-rotating manner.

21. The dough transfer hopper of claim 20 wherein said second conveyor assembly further comprises a support frame supporting said first and second conveyors belts at an inclined orientation relative to said first conveyor assembly.

22. The dough transfer hopper of claim 13 wherein said pair of end walls and said pair of side walls define a tapered chute terminating at said lower opening.

23. The dough transfer hopper of claim 22 wherein each of said pair of end walls having an inwardly angled lower portion.

24. A dough transfer hopper comprising:
a hopper assembly including a pair of end walls laterally spaced apart by a pair of side walls, each of said pair of side walls having an arcuate side wall portion terminating at a lower opening;
a base assembly supporting said hopper assembly; and
a cutting assembly including:
a first cutter operatively coupled to a drive assembly for rotation in a first direction, said first cutter having a first axle shaft defining a first longitudinal axis and a first cutting blade having a first end secured to said first axle shaft and extending radially outwardly from said first axle shaft to terminate at a second end which is bent forwardly in said first direction along an axis parallel to said first longitudinal axis; and
a second cutter operatively coupled to said drive assembly for rotation in a second direction which is opposite said first direction, said second cutter having a second axle shaft defining a second longitudinal axis and a second cutting blade having a first end secured to said second axle shaft and extending radially outwardly from said second axle shaft to terminate at a second end which is bent forwardly in said second direction along an axis parallel to said second longitudinal axis;
said cutting assembly being supported from said base assembly such that said first longitudinal axis and said second longitudinal axis lie substantially within a plane defined by said lower opening.

25. The dough transfer hopper of claim 24 wherein one of said pair of side walls has a recessed lip portion formed in said upper portion thereof.

26. The dough transfer hopper of claim 24 wherein said second end of each of said first and second cutting blade has a cutting edge formed thereon.

27. The dough transfer hopper of claim 26 wherein said cutting edge has a knife edge formed thereon.

28. The dough transfer hopper of claim 24 further comprising a first conveyor assembly including a conveyor belt operatively disposed beneath said cutting assembly.

29. The dough transfer hopper of claim 28 wherein said first conveyor assembly is positioned in a substantially horizontal orientation beneath said cutting assembly.

30. The dough transfer hopper of claim 28 further comprising a second conveyor assembly operatively positioned at a discharge end of said first conveyor assembly, said second conveyor assembly having a first conveyor belt rotating and a second conveyor belt spaced apart from said first conveyor belt in a substantially parallel manner, said first and second conveyor belts rotating in a counter-rotating manner.

31. The dough transfer hopper of claim 30 wherein said second conveyor assembly further comprises a support frame supporting said first and second conveyors belts at an inclined orientation relative to said first conveyor assembly.

32. The dough transfer hopper of claim 24 wherein said pair of end walls and said pair of side walls define a tapered chute terminating at said lower opening.

33. The dough transfer hopper of claim 32 wherein each of said pair of end walls having an inwardly angled lower portion.

* * * * *